(12) United States Patent
Katayama et al.

(10) Patent No.: US 6,424,760 B1
(45) Date of Patent: Jul. 23, 2002

(54) OPTICAL MULTIPLEXER/DEMULTIPLEXER

(75) Inventors: Makoto Katayama; Masayuki Nishimura; Shigeru Tanaka, all of Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 8 days.

(21) Appl. No.: 09/750,281

(22) Filed: Dec. 29, 2000

(51) Int. Cl.[7] ................................................ G02B 6/28
(52) U.S. Cl. ............................ 385/24; 385/37; 359/130
(58) Field of Search .............................. 385/24, 46, 14, 385/37, 17, 30; 359/127, 124, 130

(56) References Cited

U.S. PATENT DOCUMENTS 5,586,209 A * 12/1996 Matsuura et al. ............ 385/132
5,745,619 A *  4/1998 Li et al. ........................ 385/42
6,195,481 B1 *  2/2001 Nakajima et al. ........... 359/115

FOREIGN PATENT DOCUMENTS

JP       7-63934       3/1995

* cited by examiner

Primary Examiner—Hemang Sanghavi
Assistant Examiner—Scott Knauss
(74) Attorney, Agent, or Firm—McDermott, Will & Emery

(57) ABSTRACT

The present invention relates to an optical multiplexer/demultiplexer which ameliorates the deterioration in crosstalk characteristics between adjacent signal channels in a simpler configuration with a better reproducibility. In this optical multiplexer/demultiplexer, a space filled with cladding glass having a size which is at least three times the width or thickness of each channel waveguide is provided between the slab and channel waveguides. This configuration effectively improves the deterioration in crosstalk between adjacent signal channels on a par with the case where the slab and channel waveguides are directly connected to each other.

20 Claims, 3 Drawing Sheets

OPTICAL MULTIPLEXER/DEMULTIPLEXER

BACKGROUND OF THE INVENTION

1. Field of the Invention

The present invention relates to an arrayed waveguide grating (AWG) type optical multiplexer/demultiplexer which is employable as a wavelength selecting device in a wavelength division multiplexing (WDM) transmission system.

2. Related Background Art

AWG type optical multiplexer/demultiplexers (hereinafter referred to as AWG circuits) are widely in use as a wavelength filter, which can take out or insert a specific wavelength upon interference, for a wavelength-selecting device in WDM transmission systems. Also, since the AWG circuits can be realized by general fine processing procedures such as lithography or etching without necessitating the machining as precise as that of diffraction gratings or the forming of multilayer films as precise as that of interference films, they are expected to develop as a main optical device in future WDM transmission systems together with their capability of assembling with other optical waveguide devices.

Such an AWG circuit has a structure in which an input waveguide, an input slab waveguide, a plurality of channel waveguides having respective lengths different from each other (phased array), an output slab waveguide, and an output waveguide are integrally formed on a single substrate and are covered with cladding glass. For lowering loss in a conventional AWG circuit, in particular, it is necessary for the channel waveguides to be processed such that each has a rectangular cross-sectional structure, and that they are disposed closer to each other. Between adjacent waveguides in which the waveguides are disposed closer to each other as in a connecting portion between the slab and channel waveguides, however, a void may occur without being filled with cladding glass, whereby the AWG circuit may not be made with a favorable reproducibility as designed.

In order to prevent the incomplete filling of cladding glass from occurring as mentioned above and yield an AWG circuit which is easy to make with a favorable reproducibility, Japanese Patent Application Laid-Open No. HEI 7-63934 discloses a structure in which adjacent waveguides such as those between slab and channel waveguides are separated from each other. by about 1 to 10 $\mu$m, whereas thus formed gap is filled with cladding glass.

SUMMARY OF THE INVENTION

The inventors have studied the conventional AWG circuits and, as a result, have found a problem as follows.

In the AWG circuit disclosed in Japanese Patent Application Laid-Open No. HEI 7-63934, adjacent waveguides are separated from each other by about 1 to 10 $\mu$m in order to suppress the excess loss caused by diffraction to a maximum of 0.1 dB which is fully negligible. However, the conventional AWG circuits have been problematic in that crosstalk characteristics between adjacent signal channels remarkably deteriorate even when the space between the adjacent waveguides is set such that the excess loss caused upon filling with cladding glass can be suppressed to a fully negligible level.

In order to overcome the problem mentioned above, it is an object of the present invention to provide an optical multiplexer/demultiplexer which ameliorates the deterioration in crosstalk characteristics between adjacent channels in a simpler configuration with a better reproducibility.

The optical multiplexer/demultiplexer according to the present invention is an AWG type optical multiplexer/demultiplexer, employable as a wavelength-selecting device in a WDM transmission system, comprising a substrate, and at least one input waveguide, a first slab waveguide, a plurality of channel waveguides, a second slab waveguide, and a plurality of output waveguides provided for respective signal channels, which are disposed on the substrate.

In the optical multiplexer/demultiplexer according to the present invention, the first and second slab waveguides have respective predetermined slab lengths. In general, a slab length corresponds to the focal length of the optical input end functioning as the lens surface of the respective slab waveguide. The input waveguide is a waveguide for guiding to the first slab waveguide individual signals having respective channel wavelengths set at predetermined wavelength intervals as signal channels, and has an output end optically connected to an optical input end face of the first slab waveguide. The plurality of channel waveguides are waveguides having lengths different from each other , and are two-dimensionally arranged on the substrate while in a state where an optical input end of each channel waveguide is optically connected to an optical output end face of the first slab waveguide so as to sandwich the first slab waveguide together with the input waveguide whereas an optical out put end of each channel waveguide is optically connected to an optical input end face of the second slab waveguide so as to sandwich the second slab waveguide together with the output waveguides. The output waveguides are waveguides two-dimensionally arranged on the substrate while in a state where respective optical input ends thereof are optically connected to an optical output end face of the second slab waveguide, and are used for separately taking out signals having respective channel wavelengths set at predetermined wavelength intervals.

In particular, the inventors have found the fact that the deterioration in crosstalk between adjacent signal channels is remarkably ameliorated when adjacent waveguides are separated from each other by a predetermined value or more in a portion where the waveguides are disposed closer to each other, e.g., between the slab and channel waveguides, thereby accomplishing the optical multiplexer/demultiplexer according to the present invention.

Namely, in order to ameliorate the deterioration in crosstalk between adjacent signal channels caused upon separating adjacent waveguides from each other, at least one of the space between the optical input end of each channel waveguide and the optical output end face of the first slab waveguide, and the space between the optical output end of each channel waveguide and the optical input end face of the second slab waveguide is set to at least three times the width or thickness of each channel waveguide in the optical multiplexer/demultiplexer according to the present invention.

Preferably, at least the channel waveguides have a relative refractive index difference of 0.75% or more with respect to the substrate. It is because of the fact that if the relative refractive index difference of the channel waveguides with respect to the substrate is made greater, then the light confining effect improves, whereby the channel waveguide intervals can be set narrower.

Preferably, in the optical multiplexer/demultiplexer according to the present invention, the channel waveguides are arranged such that the respective optical input ends thereof oppose the optical output end face of the first slab waveguide over 90% or more of the area of the optical output end face in a direction perpendicular to the substrate. Preferably, the channel waveguides are arranged such that the respective optical output ends thereof oppose the optical input end face of the second slab waveguide over 90% or more of the area of optical input end face in a direction perpendicular to the substrate on the second slab waveguide side as well. It is because of the fact that a greater light capturing angle is further effective in ameliorating the crosstalk between adjacent signal channels.

The gap between the adjacent waveguides (e.g., slab and channel waveguides) somewhat fluctuates depending on the relative refractive index differences of these waveguides with respect to the substrate. Therefore, in order to ameliorate the deterioration in crosstalk between adjacent signal channels caused upon separating the adjacent waveguides from each other in the optical multiplexer/demultiplexer according to the present invention, it is further preferred that at least one of the space between the optical input end of each channel waveguide and the optical output end face of the first slab waveguide, and the space between the optical output end of each channel waveguide and the optical input end face of the second slab waveguide be set to 2M or more but 6M or less, where M is the mode field diameter of light propagating through the channel waveguide.

In order to improve the effect of buried cladding glass and ameliorate the crosstalk deterioration between adjacent signal channels in the optical multiplexer/demultiplexer according to the present invention, each input waveguide is preferably arranged on the substrate such that the optical output end thereof is separated from the optical input end face of the first slab waveguide by ½ or more of the thickness of the input waveguide. Similarly, each of the output waveguides is preferably arranged on the substrate such that the optical input end thereof is separated from the optical output end face of the second slab waveguide by ½ or more of the thickness of the output waveguide.

In a specific embodiment, the optical multiplexer/demultiplexer according to the present invention comprises thirty or more output waveguides (i.e., thirty or more signal channels to be multi/demultiplexed), and makes it possible to multi/demultiplex signal channels having a wavelength interval of 100 GHz or less. Therefore, in the optical multiplexer/demultiplexer, it is preferred that the channel waveguides be arranged at an interval of 15 $\mu$m or less. Preferably, the output waveguides are arranged at an interval of 20 $\mu$m or less. Preferably, each of the first and second slab waveguides is designed to have a slab length of 15 mm or less.

DESCRIPTION OF THE PREFERRED EMBODIMENTS

In the following, embodiments of the optical multiplexer/demultiplexer according to the present invention will be explained in detail with reference to FIGS. 1 to 5. Among the drawings, parts identical to each other will be referred to with numerals identical to each other without repeating their overlapping explanations.

Figure 1:
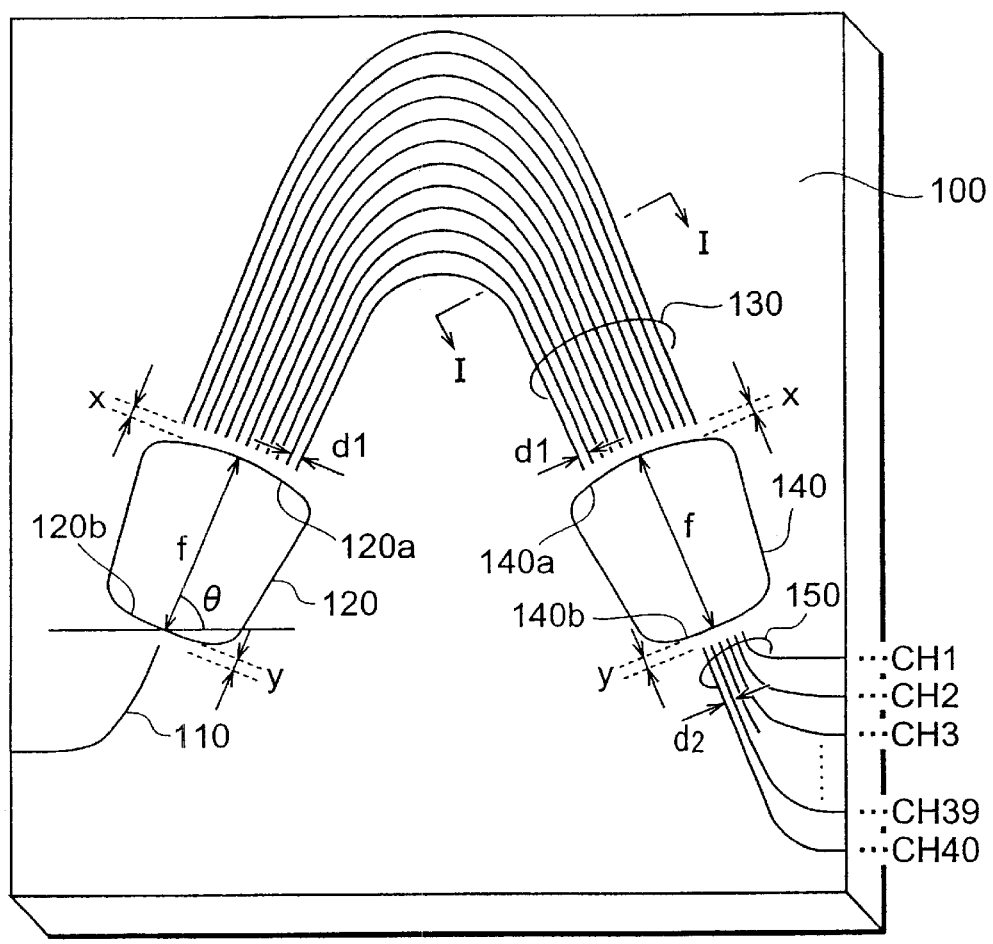
FIG. 1 is a plan view showing the schematic configuration of the optical multiplexer/demultiplexer according to the present invention.

FIG. 1 is a plan view showing the configuration of an AWG circuit as the optical multiplexer/demultiplexer according to the present invention. As depicted, this optical multiplexer/demultiplexer is an optical component in which optical waveguide parts are integrally formed on a silica glass substrate 100. Namely, at least one input waveguide 110, a first slab waveguide 120 (input slab waveguide), a plurality of channel waveguides 130, a second waveguide 140 (output slab waveguide), and output waveguides 150 corresponding to respective signal channels CH1, CH2, . . . , CH39, and CH40 are disposed on the substrate 100.

Figure 2:
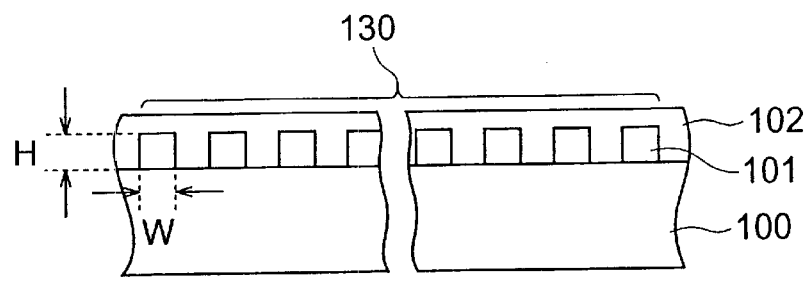
FIG. 2 is a view showing the cross-sectional structure of the optical multiplexer/demultiplexer taken along the line I—I shown in FIG. 1.
Figure 3:
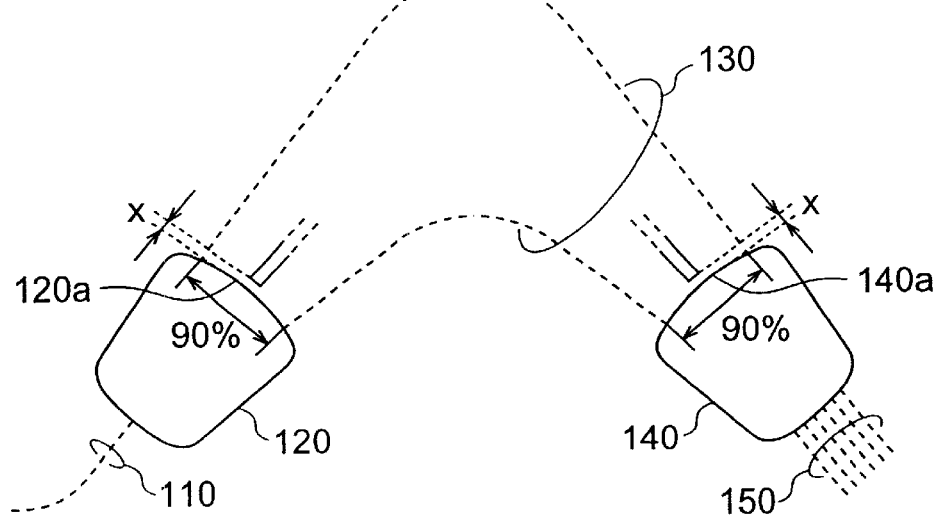
FIG. 3 is a plan view for schematically explaining the waveguide structure of a sample manufactured as an embodiment of the optical multiplexer/demultiplexer according to the present invention.

Each of the waveguide parts is doped with $GeO_2$, whereas the doping amount of $GeO_2$ is such that the relative refractive index difference between the substrate 100 and the waveguide parts is 0.75% or more in order to make it possible to lower the radius of curvature of channel waveguides 130 (improve the light confinement efficiency). The substrate 100 is not restricted to the silica glass substrate, and may be constituted by a silicon substrate and a glass layer having a thickness of ten to several tens of micrometers formed on the silicon substrate. Similar operations and effects are also obtained when waveguides doped with $GeO_2$ are formed on this glass layer. FIG. 2 is a view showing the cross-sectional structure of AWG circuit taken along the line I—I of FIG. 1, in which a core 101 (having a width W and a thickness (height) H) to become a waveguide and a cladding 102 covering the core 101 are disposed on the substrate 100.

The first slab waveguide 120 has a flat optical output end face 120a, disposed at an angle θ, with respect to the incident angle of light fed to the optical multiplexer/demultiplexer, to which the optical input ends of channel waveguides 130 are optically connected; and an optical input end face 120b to which the optical output end of input waveguide 110 is optically connected. The second slab waveguide 140 has a flat optical input end face 140a to which the optical output ends of channel waveguides 130 are optically connected, and an optical output end face 140b to which the optical input ends of output waveguides 150 are optically connected. Each of the first and second slab waveguides 120, 140 has a slab length f. Here, the slab length corresponds to the focal length of the convex lens surface located at the optical input end face in each of the first and second slab waveguides 120, 140.

The input waveguide 110 is a waveguide for guiding to the first slab waveguide 120 individual signals having respective channel wavelengths which are set at predetermined wavelength intervals as signal channels, and has an output end optically connected to the optical input end face 120b of first slab waveguide 120. The channel waveguides 130 are waveguides having respective lengths different from each other, and are two-dimensionally arranged on the substrate 100. The channel waveguides 130 are optically connected to the optical output end face 120a of first slab waveguide 120 so as to sandwich the first slab waveguide 120 together with the input waveguide 110, and are optically connected to the optical input end face 140a of second slab waveguide 140 so as to sandwich the second slab waveguide 140 together with the output waveguides 150. The output waveguides 150 are waveguides two-dimensionally arranged on the substrate 100 while in a state where respective optical input ends are optically connected to the optical output end face 140b of second slab waveguide 140, so as to correspond to individual signals having respective channel wavelengths set at predetermined wavelength intervals, i.e., so as to correspond to the respective signal channels.

Though the optical multiplexer/demultiplexer shown in FIG. 1 is explained as an AWG circuit, in which light successively propagates through the input waveguide 110, first slab waveguide 120, channel waveguides 130, second slab waveguide 140, and output waveguides 150, enabling 40 channels of signals to be separated from each other, a plurality of input waveguides may be provided so as to correspond to the respective signal channels, thereby realizing an AWG circuit which enables wavelength multiplexing.

In particular, the inventors have found the fact that the deterioration in crosstalk between adjacent signal channels is remarkably ameliorated when adjacent waveguides are separated from each other by a predetermined value or more in a portion where the waveguides are disposed closer to each other, e.g., between the slab and channel waveguides, thereby accomplishing the optical multiplexer/demultiplexer according to the present invention.

Therefore, in order to effectively ameliorate the deterioration in crosstalk between adjacent signal channels caused upon separating adjacent waveguides such as the slab waveguide 140 and the channel waveguides 130 from each other, at least one of the space between the optical input ends of channel waveguides 130 and the optical output end face 120a of first slab waveguide 120, and the space between the optical output ends of channel waveguides 130 and the optical input end face 140a of second slab waveguide 140 is set to at least three times the width or thickness of each channel waveguide (so as to yield a space x shown in FIG. 1) in the optical multiplexer/demultiplexer according to the present invention. Here, the gap between the adjacent waveguides somewhat fluctuates depending on the relative refractive index differences of these waveguides with respect to the substrate 100. Therefore, at least one of the space between the optical input ends of channel waveguides 130 and the optical output end face 120a of first slab waveguide 120, and the space between the optical output ends of channel waveguides 130 and the optical input end face 140a of second slab waveguide 140 in the optical multiplexer/demultiplexer according to the present invention is set to 2M or more but 6M or less, where M is the mode field diameter of light propagating through the channel waveguides 130.

In the optical multiplexer/demultiplexer according to the present invention, each of the waveguides including the channel waveguides 130 has a relative refractive index difference of 0.75% or more with respect to the substrate 100. It is because of the fact that if the relative refractive index difference of each of the waveguides 110 to 150 is made greater, then the light confining effect improves, whereby the waveguide intervals can be set narrower.

Preferably, in the optical multiplexer/demultiplexer according to the present invention, the channel waveguides 130 are arranged such that the respective optical input ends thereof oppose the optical output end face 120a of first slab waveguide 120 over 90% or more of the area of optical output end face 120a in a direction perpendicular to the substrate 100. Also, the channel waveguides 130 are arranged such that the respective optical output ends thereof oppose the optical input end face 140a of second slab waveguide 140 over 90% or more of the area of optical input end face 140a in a direction perpendicular to the substrate on the second slab waveguide 140 side. It is because of the fact that a greater light capturing angle is further effective in ameliorating the crosstalk between adjacent signal channels.

In order to improve the effect of buried cladding glass (corresponding to the cladding 102 in FIG. 2) and ameliorate the crosstalk deterioration between adjacent signal channels in the optical multiplexer/demultiplexer according to the present invention, the input waveguide 110 is arranged on the substrate 100 such that the optical output end thereof is separated from the optical input end face 120b of first slab waveguide 120 by ½ or more of the thickness of input waveguide 110. Similarly, each of the output waveguides 150 is preferably arranged on the substrate 100 such that the optical input end thereof is separated from the optical output end face 140b of second slab waveguide 140 by ½ or more of the thickness of output waveguide 150 (so as to yield a gap y in FIG. 1).

Preferably, as a specific mode in practical use, the optical multiplexer/demultiplexer is an optical device comprising thirty or more output waveguides 150 (i.e., having thirty or more signal channels CH to be multi/demultiplexed) and enabling signal channels having a wavelength interval of 100 GHz or less to be multi/demultiplexed. Here, in the optical multiplexer/demultiplexer, the channel waveguides 130 are arranged at an interval d1 of 15 $\mu$m or less, the output waveguides 150 are arranged at an interval d2 of 20 $\mu$m or less, and each of the first and second slab waveguides 120, 140 has a slab length f of 15 mm or less.

The inventors designed an AWG circuit capable of separating 40 channels of signals having a signal wavelength interval $\Delta\lambda$ of 100 GHz and a center channel wavelength (CH20) of 1550.918 nm so as to satisfy the above-mentioned specific mode.

In thus designed AWG circuit, the relative refractive index difference between the substrate 100 and each of the waveguide parts 110 to 150 is 1.5%, whereas each of the Ad waveguides 110, 130, 150 has a core width W of 4.3 $\mu$m and a core thickness H of 4.3 $\mu$m. In this case, the mode field diameter is 5.5 $\mu$m. Each of the first and second slab waveguides 120, 140 has a slab length f of 4800 $\mu$m, the substrate 100 has a size of 20 mm×20 mm with a thickness of 0.5 mm, the channel waveguides 130 have an interval d1 of 6.0 $\mu$m, the number of channel waveguides 130 is 80, the installation angle θ of second slab waveguide 120 is 80 degrees, and the output waveguides 150 have an interval d2 of 15 $\mu$m. The individual channel waveguides 130 have an optical path length difference $\Delta L$ of 36.702 $\mu$m and a radius of curvature of 2 mm.

In the sample designed as the AWG circuit according to the present invention, as mentioned above, each of the space between the optical output end face 120a of first slab waveguide 120 and the optical input ends of channel waveguides 130, and the space between the optical output end face 140a of second slab waveguide 140 and the optical output ends of channel waveguides 130 has at least a predetermined length x ($\mu$m). Also, the channel waveguides 130 are arranged such that the respective optical input ends thereof oppose the optical output end face 120a of first slab waveguide 120 over 90% or more of the area of output end face 120a in a direction perpendicular to the substrate 100, whereas the respective optical output ends thereof oppose the optical input end face 140a of second slab waveguide 140 over 90% or more of the area of the optical input end face 140a in a direction perpendicular to the substrate on the second slab waveguide 140 side.

Figure 4:
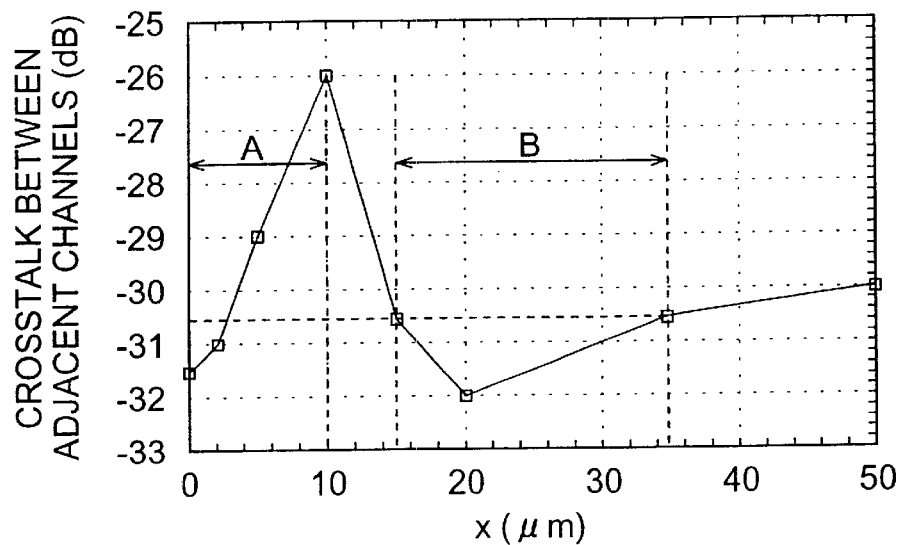
FIG. 4 is a graph showing results of measurement of crosstalk concerning the sample manufactured as an embodiment of the optical multiplexer/demultiplexer according to the present invention at its center channel (CH20) when the gap x between slab and channel waveguides is changed.
Figure 5:
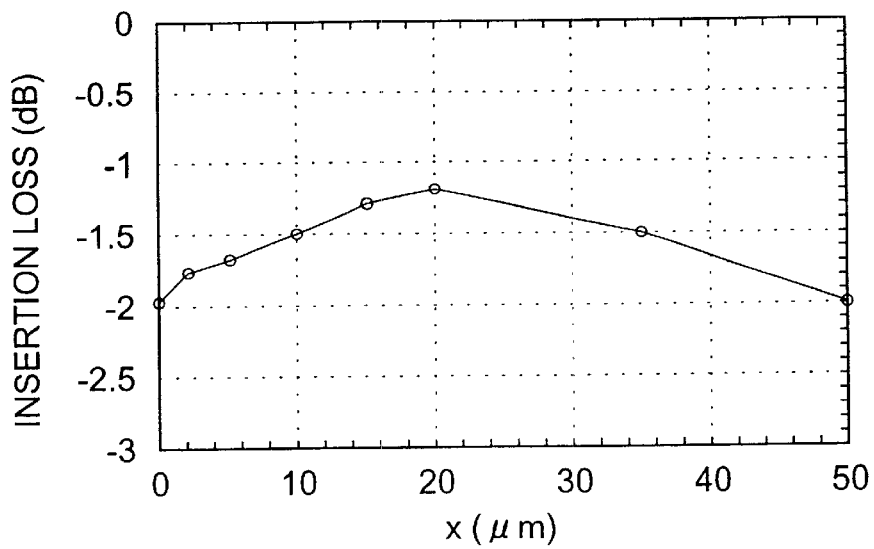
FIG. 5 is a graph showing results of measurement of insertion loss concerning the sample manufactured as an embodiment of the optical multiplexer/demultiplexer according to the present invention at its center channel (CH20) when the gap x between slab and channel waveguides is changed.

The inventors measured the change in crosstalk and the insertion loss concerning the above-mentioned sample centered at the channel CH20 when the gap x between each of the first and second slab waveguides 120, 140 and the channel waveguides 130 was changed. FIG. 4 is a graph showing the results of measurement of crosstalk concerning the above-mentioned sample at the channel CH20 when the gap x was changed. FIG. 5 is a graph showing the results of measurement of insertion loss concerning the above-mentioned sample at the channel CH20 when the gap x was changed.

As can be seen from FIG. 4, the crosstalk between adjacent signal channels once increases as the gap x is made greater and then, at a predetermined gap or greater, decreases to a level on a par with that obtained when the slab waveguides 120, 140 are directly connected to the channel waveguides 130 (x=0 $\mu$m). The same tendency can hold for the insertion loss.

Though this phenomenon cannot be explained definitely, it may be presumed as a hypothesis that the probability of a part of the light propagated as a core mode through a channel a waveguide directly connected to the slab waveguides 120, 140 (x=0 $\mu$m) propagating as a core mode of an adjacent channel waveguide after propagating through a cladding layer between the slab and channel waveguides increases in region A where the gap x between the slab and channel waveguides is relatively small, thereby deteriorating crosstalk characteristics. If the gap x between the slab and channel waveguides exceeds a certain value (region B in FIG. 4), by contrast, then a part of light propagated as a core mode through the channel waveguide propagates through a cladding layer between the slab and channel waveguides over a considerably long distance, thereby remarkably increasing the probability of a part thereof becoming a radiation mode. It is presumed that, as a result, the probability of light propagating as a core mode of an adjacent channel waveguide decreases, whereby crosstalk characteristics improve.

In accordance with the foregoing studies, in order to ameliorate the deterioration in crosstalk between adjacent signal channels caused upon separating adjacent waveguides from each other, at least one of the space between the optical input ends of channel waveguides 130 and the optical output end face 120a of first slab waveguide 120, and the space between the optical output ends of channel waveguides 130 and the optical output end face 140a of second slab waveguide 140 is set to at least three times the width or thickness of each of the channel waveguides 130 in the optical multiplexer/demultiplexer according to the present invention. In other words, at least one of the space between the optical input ends of channel waveguides 130 and the optical output end face 120a of first slab waveguide 120, and the space between the optical output ends of channel waveguides 130 and the optical input end face 140a of second slab waveguide 140 is set to 2M or more but 6M or less, where M is the mode field diameter of light propagating through the channel waveguides 130.

Though the above-mentioned sample illustrates a configuration in which the first and second slab waveguides 120, 140 and the channel waveguides 130 are separated from each other by a predetermined distance, the input waveguide 110 and first slab waveguide 120, and the output waveguides 150 and second slab waveguide 140 may also be separated from each other by way of cladding glass in order to further improve the effect of buried cladding.

In the present invention, as in the foregoing, a space filled with cladding glass having a size which is at least three times the width or thickness of each channel waveguide is provided between each of the first and second slab waveguides and the channel waveguides. The present invention is accomplished by the fact found by the inventors, which has not been attainable from the prior art at all, and is effective in that the deterioration in crosstalk between adjacent signal channels can effectively be improved on a par with the case where each slab waveguide and channel waveguides are directly connected to each other in a simpler configuration having a better reproducibility.

What is claimed is:

1. An optical multiplexer/demultiplexer comprising:
   a substrate;
   first and second slab waveguides, each having a predetermined slab length, disposed on said substrate;
   at least one input waveguide, disposed on said substrate, having an optical output end optically connected to an optical input end face of said first slab waveguide;
   a plurality of output waveguides two-dimensionally arranged on said substrate while in a state where respective optical input ends thereof are optically connected to an optical output end face of said second slab waveguide, said output waveguides being provided so as to correspond to respective signals having channel wavelengths set as signal channels at a predetermined wavelength interval; and
   a plurality of channel waveguides two-dimensionally arranged on said substrate while in a state where an optical input end of each channel waveguide is optically connected to an optical output end face of said first slab waveguide so as to sandwich said first slab waveguide together with said input waveguide whereas an optical output end of each channel waveguide is optically connected to an optical input end face of said second slab waveguide so as to sandwich said second slab waveguide together with said output waveguides, said channel waveguides having respective lengths different from each other;
   wherein each of said channel waveguides is arranged on said substrate while in a state where a space between said optical output end face of said first slab waveguide and said optical input end of said channel waveguide is at least three times a width or thickness of each of said channel waveguides so as to ameliorate deterioration in a crosstalk characteristic between adjacent signal channels caused upon separating said channel waveguide and said first slab waveguide from each other.

2. An optical multiplexer/demultiplexer according to claim 1, wherein at least said channel waveguides have a relative refractive index difference of 0.75% or more with respect to said substrate.

3. An optical multiplexer/demultiplexer according to claim 1, wherein said channel waveguides are arranged such that the respective optical input ends thereof oppose said optical output end face of said first slab waveguide over 90% or more of the area of said optical output end face in a direction perpendicular to said substrate.

4. An optical multiplexer/demultiplexer according to claim 1, wherein each of said channel waveguides is disposed on said substrate while in a state where said space between said optical output end face of said first slab waveguide and said optical input end of said channel waveguide is 2M or more but 6M or less, where M is a mode field diameter of light propagating through said channel waveguide.

5. An optical multiplexer/demultiplexer according to claim 1, wherein said input waveguide is arranged on said substrate such that said optical output end thereof is spaced from said optical input end face of said first slab waveguide by ½ or more of a thickness of said input waveguide.

6. An optical multiplexer/demultiplexer according to claim 1, wherein said channel waveguides are arranged at an interval of 15 µm or less.

7. An optical multiplexer/demultiplexer according to claim 1, wherein said output waveguides are arranged at an interval of 20 µm or less.

8. An optical multiplexer/demultiplexer according to claim 1, wherein each of said first and second slab waveguides has a slab length of 15 mm or less.

9. An optical multiplexer/demultiplexer according to claim 1, wherein said optical multiplexer/demultiplexer comprises thirty or more output waveguides.

10. An optical multiplexer/demultiplexer according to claim 1, wherein said channel wavelength interval is 100 GHz or less.

11. An optical multiplexer/demultiplexer comprising:

a substrate;

first and second slab waveguides, each having a predetermined slab length, disposed on said substrate;

at least one input waveguide, disposed on said substrate, having an optical output end optically connected to an optical input end face of said first slab waveguide;

a plurality of output waveguides two-dimensionally arranged on said substrate while in a state where respective optical input ends thereof are optically connected to an optical output end face of said second slab waveguide, said output waveguides being provided so as to correspond to respective signals having channel wavelengths set as signal channels at a predetermined wavelength interval; and a plurality of channel waveguides two-dimensionally arranged on said substrate while in a state where an optical input end of each channel waveguide is optically connected to an optical output end face of said first slab waveguide so as to sandwich said first slab waveguide together with said input waveguide whereas an optical output end of each channel waveguide is optically connected to an optical input end face of said second slab waveguide so as to sandwich said second slab waveguide together with said output waveguides, said channel waveguides having respective lengths different from each other;

wherein each of said channel waveguides is arranged on said substrate while in a state where a space between said optical input end face of said second slab waveguide and said optical output end of said channel waveguide is at least three times a width or thickness of each of said channel waveguides so as to ameliorate deterioration in a crosstalk characteristic between adjacent signal channels caused upon separating said channel waveguide and said second slab waveguide from each other.

12. An optical multiplexer/demultiplexer according to claim 11, wherein at least said channel waveguides have a relative refractive index difference of 0.75% or more with respect to said substrate.

13. An optical multiplexer/demultiplexer according to claim 11, wherein said channel waveguides are arranged such that the respective optical output ends thereof oppose said optical input end face of said second slab waveguide over 90% or more of the area of said optical output end face in a direction perpendicular to said substrate.

14. An optical multiplexer/demultiplexer according to claim 11, wherein each of said channel waveguides is disposed on said substrate while in a state where said space between said optical output end face of said second slab waveguide and said optical input end of said channel waveguide is 2M or more but 6M or less, where M is a mode field diameter of light propagating through said channel waveguide.

15. An optical multiplexer/demultiplexer according to claim 11, wherein each said output waveguide is arranged on said substrate such that said optical input end thereof is spaced from said optical output end face of said second slab waveguide by ½ or more of a thickness of said output waveguide.

16. An optical multiplexer/demultiplexer according to claim 11, wherein said channel waveguides are arranged at an interval of 15 µm or less.

17. An optical multiplexer/demultiplexer according to claim 11, wherein said output waveguides are arranged at an interval of 20 µm or less.

18. An optical multiplexer/demultiplexer according to claim 11, wherein each of said first and second slab waveguides has a slab length of 15 mm or less.

19. An optical multiplexer/demultiplexer according to claim 11, wherein said optical multiplexer/demultiplexer comprises thirty or more output waveguides.

20. An optical multiplexer/demultiplexer according to claim 11, wherein said channel wavelength interval is 100 GHz or less.

* * * * *